Patented Feb. 16, 1954

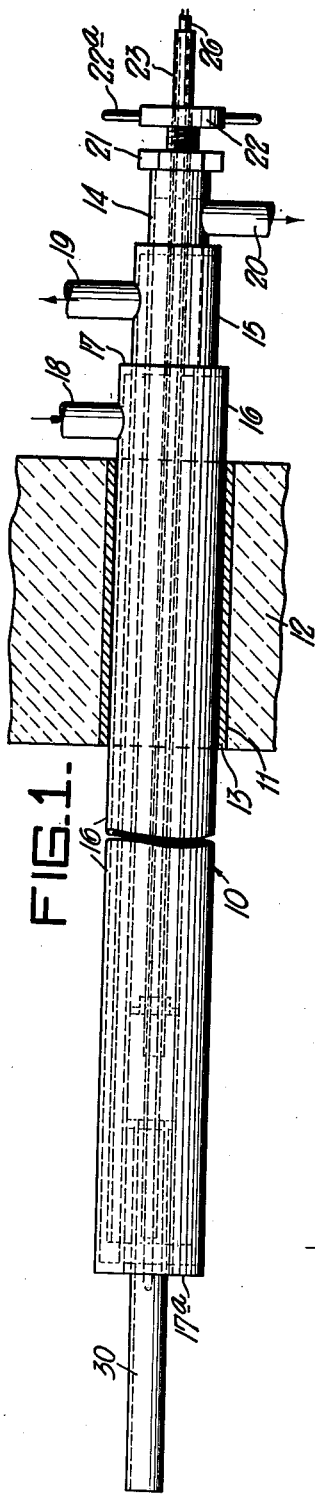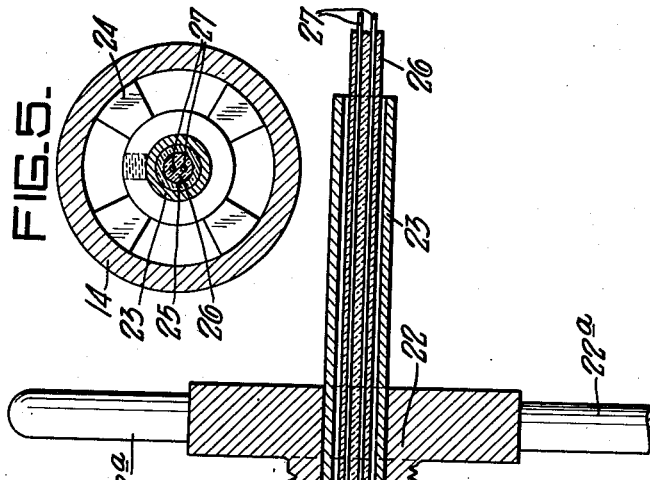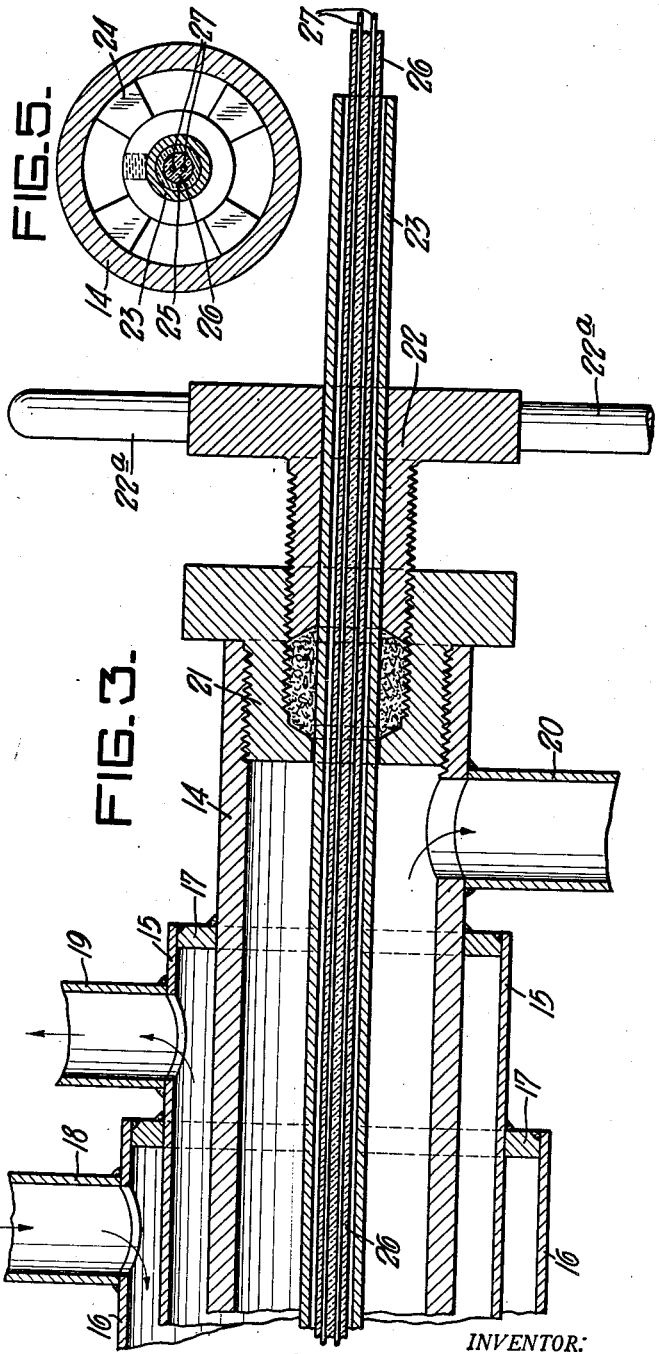

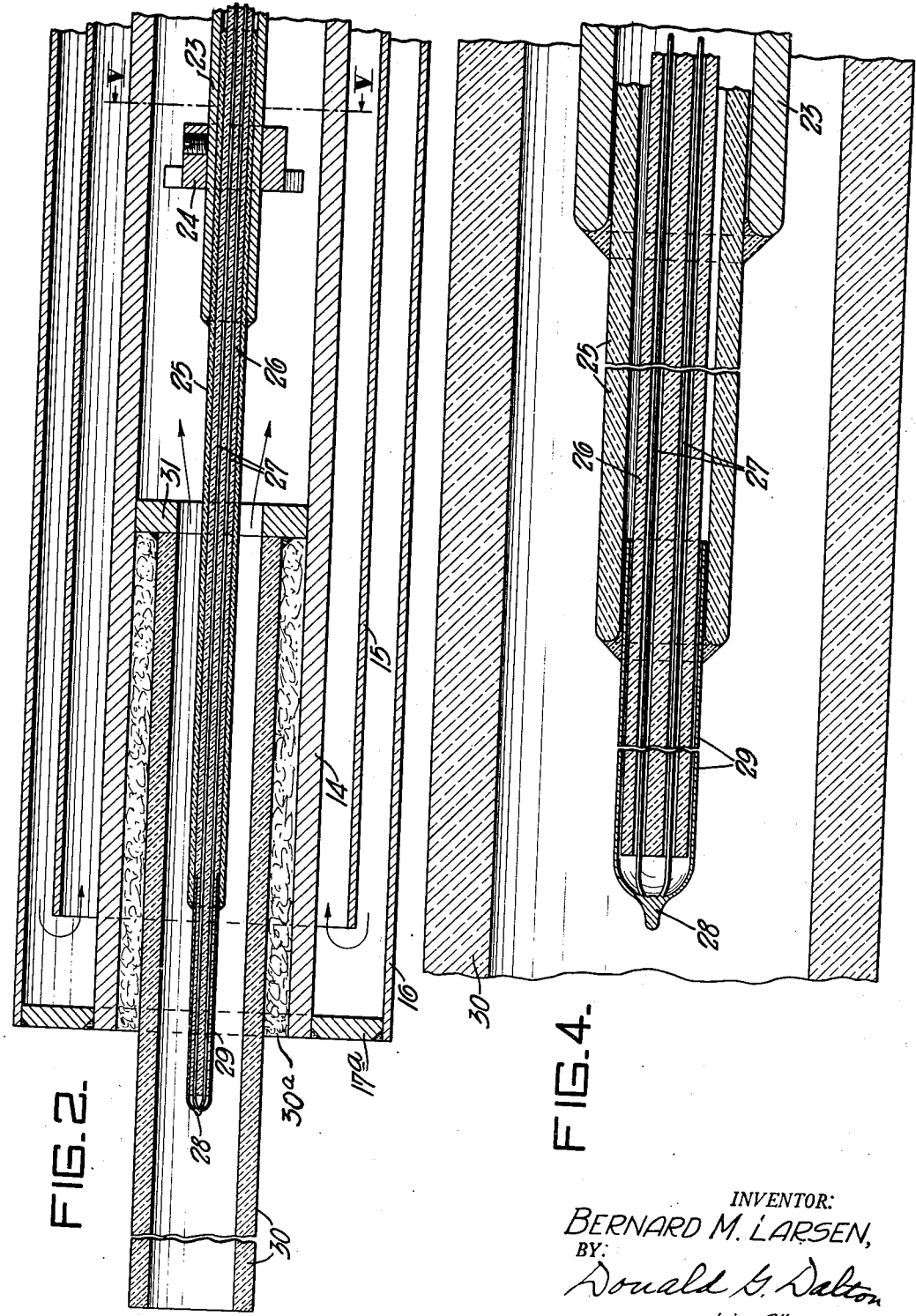

2,669,593

UNITED STATES PATENT OFFICE 2,669,593

ASPIRATOR THERMOCOUPLE MOUNTING FOR MEASURING THE TEMPERATURE OF HOT GASES

Bernard M. Larsen, Fair Haven, N. J., assignor to United States Steel Corporation, a corporation of New Jersey Application November 28, 1951, Serial No. 258,705

7 Claims. (Cl. 136—4)

This invention relates to a thermocouple mounting and, in particular, to a tubular mounting for supporting a thermocouple and aspirating into contact therewith a portion of the hot gases, the temperature of which is to be measured.

It is desirable in many industrial installations to measure accurately the temperature of hot gases. One of these is the open-hearth steel furnace. In fact, the temperature of the preheated air supplied to the furnace for combustion appears to exert a very decided effect in maintaining a "sharp" flame. A temperature range of from 2350 to 2500° F. appears to be the optimum for this purpose. The measurement of the temperature of flowing gases in such a range, however, presents numerous difficulties.

In the first place, the temperature of the gases will usually differ widely from that of the walls of the refractory-lined passages through which the gases flow, e. g., by as much as several hundred degrees F., and the heat radiated from such walls to the temperature-responsive element is predominant over the convection heating effect of the gases. This causes a false indication of the gas temperature to be given. Under conditions of actual operation, furthermore, the temperature range encountered may be much greater than the optimum, e. g., from 2100 to 2800° F. Such a range constitutes extremely severe working conditions for any measuring apparatus having a pretense to accuracy. Indeed, for the particular case mentioned, the general operating conditions normally existing around a furnace are largely unfavorable to accuracy in any measuring apparatus. In addition, the periodic reversal of gas flow through the furnace further complicates the problem. Waste combustion gases carry highly corrosive fluxes from the furnace and any apparatus used for measuring the temperature of the preheated air must be removed or protected from such gases on a reversal of flow. If used on both halves of the cycle, moreover, the thermal capacity of the temperature-responsive element will cause an inaccurate indication for a time immediately following each temperature change, depending on the magnitude of such capacity.

I have invented a novel thermocouple mounting particularly adapted for installation in the uptakes of an open-hearth furnace, which overcomes the aforementioned difficulties and permits an accurate measurement of the actual gas temperature to be obtained at all times, substantially eliminating any error caused by heat radiated from the walls of the uptake. In a preferred embodiment, I mount a metal tube adapted to receive thermocouple leads, within a housing tube spaced radially therefrom. A refractory tube fits in the forward end of the lead tube. Thermocouple leads extend through the latter and are joined where they project from the end of the refractory tube. The hot junction of the leads thus formed is enclosed in a thin, highly conducting and reflective metal sheath, fitting in the end of the refractory tube. A single shielding tube of refractory material spaced radially from the sheath, fits in the forward end of the housing tube. The housing tube is provided with a cooling jacket and has a connection to an exhaust means at its outer or rear end whereby, when the mounting is inserted through the wall of a passage conveying hot gases, a small portion of such gases is pulled into and through the shielding tube for contact with the sheath, and then through the housing tube for discharge on the exterior of the passage.

A complete understanding of the invention may be obtained from the following detailed description and explanation which refer to the accompanying drawings illustrating the present preferred embodiment. In the drawings:

Figure 1 is a partial section through the wall of an uptake of an open-hearth furnace showing the thermocouple mounting of my invention in elevation, inserted through a port in the wall;

Figure 2 is a partial axial section through the forward end of the mounting, somewhat enlarged;

Figure 3 is a partial axial section through the rear end of the mounting, also enlarged;

Figure 4 is a portion of Figure 2 to a still further enlarged scale; and

Figure 5 is a partial transverse section taken on the plane of line V—V of Figure 2.

Referring now in detail to the drawings, the mounting of my invention, indicated generally at 10, is an elongated tubular structure adapted to be thrust through a port 11 in a wall 12 of a passage through which hot gases flow, such as the air uptake of an open-hearth furnace. The port has a liner or bearing sleeve 13 which is preferably fitted with a closure (not shown) to prevent outflow of gases when the mounting 10 is removed. The mounting has an overall length sufficient to reach substantially the center of the passage. This means a length of about eight feet in the case of an open-hearth uptake.

The internal construction of the mounting may be best understood by reference to Figures 2 and 3. As there shown, a housing tube 14 extends through a baffle tube 15 and a jacket tube 16. The tubes are disposed coaxially with the right-hand or rear end of each extending beyond the end of the next outer tube, the annular spaces between adjacent tubes being closed by rings 17 welded thereto. The left-hand or forward ends of tubes 14 and 16 terminate in a common plane and the space therebetween is closed by a ring 17a welded in place. The forward end of baffle tube 15 terminates short of the other two, affording communication between the annular passages defined thereby. Inlet and outlet nipples 18 and 19 are welded to the rear ends of tubes 16 and 15, respectively, whereby cooling water may be circulated forwardly through the former and rearwardly through the latter. If desired, centering spiders (not shown) may be disposed between tubes 14 and 15 and between tubes 15 and 16 at points spaced therealong, to maintain them in coaxial relation while permitting free flow of cooling water therethrough. Housing tube 14 has an exhaust nipple 20 welded thereto for connection to any suitable means producing a low vacuum such as a jet ejector, for a purpose which will appear later.

A stuffing box 21 screwed into the rear end of housing tube is provided with a gland 22 having radially extending spokes 22a by which it may be easily turned home or backed off by hand. A thermocouple-lead tube 23 preferably composed of an alloy resistant to heat and corrosion, such as steel containing about 27% chromium, extends through the stuffing box and coaxially through housing tube 14, terminating a substantial distance rearwardly from the forward end thereof. Centering spiders 24 (see Figure 5) maintain the coaxial relation of tube 23 in tube 14 while permitting fluid flow through the latter. A tube 25 of refractory material such as porcelain is cemented in the forward end of tube 23 and extends therefrom coaxially through tube 14 almost to the forward end thereof.

The details of the thermocouple proper may be best observed in Figure 4. A string of two-hole tubular insulators 26 extends through tubes 23 and 25 and somewhat beyond the forward end of the latter. These insulators are strung on thermocouple leads 27 which are brought together beyond the forward end of the insulator string to form a hot junction 28. A thin sheath 29 of metal resistant to heat and corrosion and also highly reflective (emissivity less than .2), such as platinum, fits over the junction and is cemented into the end of tube 25. The forward end of the sheath is crimped tightly around the junction or the latter is welded to the sheath to insure immediate heat exchange therebetween.

A shielding tube 30 of refractory material such as porcelain is inserted in the forward end of tube 14 and surrounds sheath 29, extending forwardly thereof a short distance, e. g., four inches. This distance should be several times, e. g., eight times, the inside diameter of the shielding tube. The outside diameter of tube 30 is substantially less than the inside diameter of tube 14 and the space between them is filled with heat-resistant packing such as asbestos cord 30a. The rear end of tube 30 abuts against a stop ring 31 fixed in tube 14 a substantial distance rearwardly of the forward end thereof.

When it is desired to use the thermocouple of mounting 10 for temperature measurement, the mounting is inserted as a unit through sleeve 13 and leads 27 are connected to any suitable indicating or recording device adapted to be actuated by the thermo-electric effect. Cooling water is circulated through tubes 16 and 15 from any convenient source via suitable connections to nipples 18 and 19. A flow of hot gases into and through tubes 30 and 14 is established by the vacuum-producing means connected to nipple 20. The thermocouple hot junction 28 is heated by convection to the temperature of the gases flowing around it. Because of the low thermal capacity of sheath 29, the thermocouple temperature follows that of the gases without any substantial lag. The single shielding tube 30 effectively blocks nearly all radiations from reaching the sheath 29, thus preventing any large error resulting from heat radiated from the walls of the uptake or other passage in which the mounting is used. Any slight amount of radiation striking it, furthermore, is almost all dissipated by the high reflecting power (80-85%) of the bright surface thereof. To this end, the exterior of the sheath is kept highly polished in use.

The position of the hot junction may be adjusted axially of the shielding tube by backing off the gland of the stuffing box and manually sliding lead tube 23 forth or back. As shown, the sheath is beyond the cooling effect of the water jacket and back of the position where it would receive any substantial amount of radiant heat. The refractory tube 25 spaces lead tube 23 from the region of maximum temperature and permits the length of sheath 29 to be reduced to a point such that its cost is not excessive. Tube 23 is thus well protected from the heat while tube 25 serving as an extension thereof, is practically unaffected by heat. Tube 30 is also practically heat-proof. Its length is kept to a minimum to reduce the danger of breakage, but it can easily be replaced if broken. The entire mounting can readily be removed from port 11 if desired, on reversal of the furnace cycle. The lead tube 23 together with tube 25 and sheath 29 can also be removed from the mounting for inspection or checking, by backing off the packing gland, leaving the remainder of the mounting in place. The outside diameter of the mounting may be made quite small (under 2½″), the limit being the size of leads which is practical.

The mounting of my invention, by eliminating most sources of error, permits very accurate measurement of gas temperatures for any purpose and is thus a great aid in various industrial operations, and particularly the control of open-hearth furnaces, the sharpness of which is strongly influenced by the temperature of the preheated air supplied thereto, as previously mentioned. The construction described is exceedingly sturdy so as to withstand the rough usage to which all furnace accessories are subjected, yet is simple to repair and maintain.

Although I have disclosed herein the present preferred embodiment of my invention, I intend to cover as well any change or modification therein which may be made without departing from the spirit and scope of the invention.

I claim:

1. A thermocouple mounting comprising a housing tube having a forward end and a rear end, a lead tube having an outside diameter smaller than the inside diameter of the housing tube extending into the rear end of the latter and thence to a point spaced inwardly from the forward end of said housing tube, a refractory tube having an outside diameter smaller than the inside diameter of the housing tube mounted coaxially therewith on the forward end of said lead tube and extending therefrom to a point adjacent the forward end of said housing tube, thermocouple leads extending through said lead tube and said refractory tube, said leads continuing forwardly to a point beyond the forward end of said refractory tube and there being united to form a hot junction, a metal sheath extending forwardly from the forward end of said refractory tube and enclosing said junction, and a shielding tube having an inside diameter larger than the outside diameter of said refractory tube, extending into the forward end of said housing tube and extending forwardly therefrom beyond said junction.

2. The apparatus defined by claim 1 characterized by an abutment in said housing tube spaced rearwardly from the forward end thereof, adapted to be engaged by said shielding tube.

3. The apparatus defined by claim 1 characterized by said shielding tube having an outside diameter less than the inside diameter of the housing tube, the space between the shielding tube and housing tube being filled with insulating packing.

4. The apparatus defined by claim 1 characterized by the forward end of said refractory tube being disposed rearwardly of the forward end of the housing tube.

5. The apparatus defined by claim 1 characterized by the forward end of the lead tube being disposed rearwardly of the rear end of the shielding tube.

6. The apparatus defined by claim 1 characterized by a centering spider on said lead tube engaging the interior of the housing tube at spaced points.

7. The apparatus defined by claim 1 characterized by said sheath having a highly reflective exterior surface.

BERNARD M. LARSEN.

References Cited in the file of this patent

UNITED STATES PATENTS

| Number | Name | Date |
|---|---|---|
| 2,368,937 | McGillin et al. | Feb. 6, 1945 |
| 2,563,931 | Harrison | Aug. 14, 1951 |
| 2,581,229 | Batter | Jan. 1, 1952 |

OTHER REFERENCES

"Temperature," American Institute of Physics, 1941, pp. 788, 791–799.